US007084346B2

(12) United States Patent
Pabst

(10) Patent No.: US 7,084,346 B2
(45) Date of Patent: Aug. 1, 2006

(54) METHOD FOR ELECTRICALLY CONNECTING A CONDUCTOR TO A CONTACT

(75) Inventor: Thomas Bernhard Pabst, Nuremberg (DE)

(73) Assignee: FCI, Versailles (FR)

( * ) Notice: Subject to any disclaimer, the term of this patent is extended or adjusted under 35 U.S.C. 154(b) by 0 days.

(21) Appl. No.: 10/531,955

(22) PCT Filed: Oct. 23, 2003

(86) PCT No.: PCT/EP03/11739

§ 371 (c)(1),
(2), (4) Date: Apr. 19, 2005

(87) PCT Pub. No.: WO2004/040702

PCT Pub. Date: May 13, 2004

(65) Prior Publication Data

US 2006/0060372 A1 Mar. 23, 2006

(30) Foreign Application Priority Data

Oct. 31, 2002 (DE) ................................ 102 50 930

(51) Int. Cl.
*H02G 15/02* (2006.01)

(52) U.S. Cl. .................... 174/74 R; 174/78; 219/56.22

(58) Field of Classification Search .................. 174/36, 174/74 R, 75 C, 78, 84 R, 84 C; 439/424, 439/882, 98, 99; 219/56.22, 56.21, 56.1
See application file for complete search history.

(56) References Cited

U.S. PATENT DOCUMENTS

| | | | | |
|---|---|---|---|---|
| 5,153,404 A | 10/1992 | Riordan et al. | 219/56.22 |
| 5,246,384 A * | 9/1993 | Sato | 439/585 |
| 5,250,127 A * | 10/1993 | Hara | 156/52 |
| 5,660,742 A * | 8/1997 | Warner et al. | 219/85.16 |
| 6,064,026 A | 5/2000 | Tkazyik et al. | 219/56.22 |
| 6,142,838 A | 11/2000 | Shinchi | 439/874 |
| 6,265,664 B1 * | 7/2001 | Sakaguchi et al. | 174/78 |
| 6,376,773 B1 * | 4/2002 | Maegawa | 174/88 R |
| 6,444,910 B1 * | 9/2002 | Goto | 174/70 B |
| 6,858,804 B1 * | 2/2005 | Murakami et al. | 174/84 R |
| 2001/0020540 A1 | 9/2001 | Sakaguchi et al. | 174/75 C |

FOREIGN PATENT DOCUMENTS

| | | |
|---|---|---|
| DE | 6 608 316 | 7/1968 |
| DE | 1 565 131 | 2/1970 |
| DE | 2 137 784 | 2/1972 |
| GB | 1 075 799 | 7/1967 |

* cited by examiner

*Primary Examiner*—William H. Mayo, III
(74) *Attorney, Agent, or Firm*—Harrington & Smith, LLP

(57) ABSTRACT

The invention relates to a method for electrically connecting a conductor to a contact, according to which the electrical conductor that is coated with an insulation is first inserted between two legs of the contact, whereupon a welding device is placed against both legs and the welding process is carried out by turning on the welding current. The insulation of the electrical conductor is destroyed due to the heat delivered during the welding process, resulting in a permanent mechanical and electrical connection between the conductor and the contact.

19 Claims, 6 Drawing Sheets

METHOD FOR ELECTRICALLY CONNECTING A CONDUCTOR TO A CONTACT

FIELD OF THE INVENTION

The present invention concerns a method for the electrical connection of an electrical conductor to a contact element as well as a plug connector with a conductor and a contact element, wherein the connection between conductor and contact element was produced according to the method. The present invention in particular concerns a method for the connection of a flat flex conductor to a contact element by resistance welding. The invention finds application, for example, in the automobile industry, where flat flex conductors are utilized increasingly due to the incorporation of additional electrical components, in order to be able to better conduct the increasingly larger current fluxes over a larger cross section of the conductor. The invention can be utilized in all types of conductors, in particular flat flex conductors, which have been produced, for example, in laminated, printed, etched or extruded manner.

BACKGROUND OF THE INVENTION

For connecting a plug connector or contact element to a conductor, various contacting techniques are known, such as crimp contactings, material-fitted contactings or clamp contactings. In the case of material-fitted contactings, the connection can be produced, for example, by soldering, adhering or welding, wherein welding methods provide better mechanical and electrical properties for the contacting sites than does soldering or adhering. When welding the conductive track to the contact element of a plug connector, the welding can be produced by resistance welding, laser welding or ultrasound welding. In the present field of plug contacts, resistance welding finds a broad application since it can be conducted simply and rapidly as well as in a cost-effective manner.

It was previously necessary, however, prior to the welding process, to strip the insulation from the electrical conductor at the end on which it is connected to the contact element. This step of stripping the insulation complicates the production process and makes it expensive, which is a particular disadvantage for the cost-sensitive automobile field.

SUMMARY OF THE INVENTION.

The object of the present invention is thus the provision of a rapid connection that is simple to conduct, cost-effective, and which can be maintained both mechanically and electrically.

This object is solved according to the invention by a method according to patent claim 1.

According to the invention, the following steps are conducted when connecting an electrical conductor to a contact element:

To begin with, the electrical conductor that is ensheathed with insulation is introduced between two legs of the contact element. Then the welding device is applied to the two legs and the welding process is conducted, whereby the welding current is turned on. The insulation of the electrical conductor is broken down by the welding current and the heat introduced thereby during the welding process, which leads to a solid mechanical and electrical connection of the conductor with the contact element.

A stripping of the insulation of the electrical conductor prior to the welding process is no longer necessary due to the method according to the invention. The electrical conductor, in a state in which the insulation is not stripped, can be simply inserted between the legs of the contact element. In this way, the welding process can be considerably shortened, which considerably reduces the cost of production of plug connector components.

In a preferred embodiment, the welding process is conducted by resistance welding, wherein the heat introduced is produced by the current flowing in the welding process and the ohmic resistance of the conductor. The method according to the invention, however, is not limited to resistance welding; other fusion welding methods such as electrical arc welding or gas welding or also other pressure welding methods can be applied.

At the beginning of the method according to the invention, for example, in a resistance welding, the current flows out over the two legs of the contact element, i.e., from the anode over one leg, then to the other leg over the cathode. The current does not yet flow over the conductor provided with insulation to the cathode. Since the introduced heat is very high and the current always seeks the shortest path, the insulation lying between the legs of the contact element, which [legs] guide the current, begins to melt, so that the current then flows directly from the anode to the first leg, then the electrical conductor to the second leg to the cathode. In this way, however, a welding current generally arises, and this current must flow first over the two legs and the point where the two legs are connected to one another via a “bypass”.

Preferably, in the welding process, the welding device is applied to the outer sides of the two legs lying opposite the conductor.

Preferably, one welding stamp of the welding device is applied to one outer side of the contact element, so that the two welding stamps sandwich the two legs of the contact element and the electrical conductor introduced therein.

In a preferred embodiment, the contact element is additionally connected to a plug connector, which can be connected to a complementary plug connector, for further guiding the current path of the electrical conductor.

Preferably, the electrical conductor is a flat flex conductor, which is produced, for example, by laminating, printing, etching or extruding. The method according to the invention, however, is not limited to the connection of flat flex conductors with contact elements. The electrical conductor can have any shape.

Preferably, the contact element is bent in S shape, whereby the conductor is inserted into one of the two openings of the S. Likewise, the contact element can also be C-shaped, whereby the conductor is then inserted into the C-shaped opening. The contact element, however, can also be laterally clipped onto the conductor. It is advantageous for the embodiment of the invention only that the electrical conductor is enclosed by the contact element on two sides which are joined together. A U-shaped formation of the contact element is also possible.

The invention likewise concerns a plug connector, which has a contact element and an electrical conductor connected to the contact element, wherein the connection between contact element and electrical conductor was produced according to the method described above.

BRIEF DESCRIPTION OF THE DRAWINGS

In order to better understand the invention, it is described in more detail below, with reference to the appended schematic drawings. Here:

In FIG. 1, a schematic structure is shown for conducting the method according to the invention. An electrical contact element 1 is shown with two legs 2 and 3, and an electrical conductor 4 is taken up between these legs. The electrical conductor 4 is here introduced into the slot between the two legs 2 and 3 with the conducting core 5, which is comprised of copper, for example, and insulation 6. Welding stamps 7, 8 in the form of an anode and a cathode of a welding device, which is not shown in further detail, are applied to the outer sides of the two legs 2, 3, for conducting the welding process. In the beginning, the welding current cannot flow from welding stamp 7 over leg 2 and conductor 5 to welding stamp 8, since an open circuit is present. In the beginning, the current in the welding process flows from welding stamp 7 over leg 2 to connection point 9 of the two legs and over the other leg 3 to the welding stamp 8, as it is shown by arrow A. The currents flowing in the welding process heat the contact element at points so very much that the insulation provided between the legs is disrupted, so that now the legs directly contact the conductor 5, so that a current flow is possible directly from welding stamp 7 over the conductor 5 to welding stamp 8 without the bypass via the connection point 9 (arrow B). In this way, a solid mechanical welded joint is produced between contact element 1 and the electrical conductor 4, without the need to first remove the insulation 6 at the level of legs 2, 3 of the contact element.

FIG. 2 plots the mechanical strength of the welded joint vs. the cross section of the conductor. In a theoretical conductor, the force, which is necessary to again detach the welded joint, increases proportionally with the wire diameter. As results additionally from the measurement curves produced by the applicant, the resistance to break in the case of a resistance welding is slightly better than, for example, in the case of a laser welding, so that it can be concluded in summary that a more solid mechanical connection can be achieved by resistance welding than with laser welding.

DETAILED DESCRIPTION OF THE INVENTION.

Figure 1:
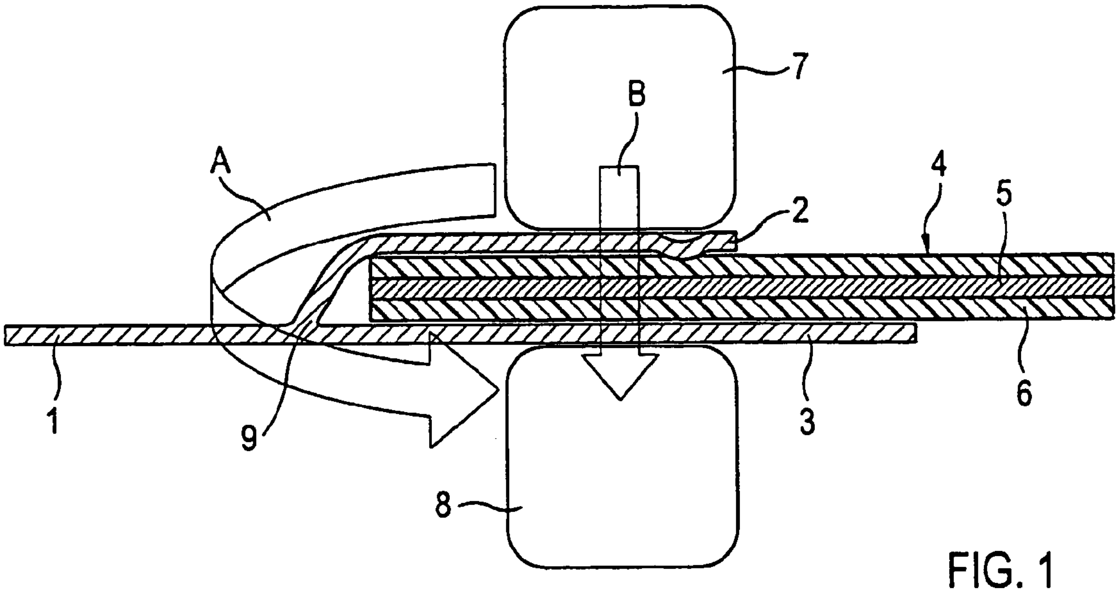
FIG. 1 shows a schematic structure for conducting the method according to the invention.
Figure 2:
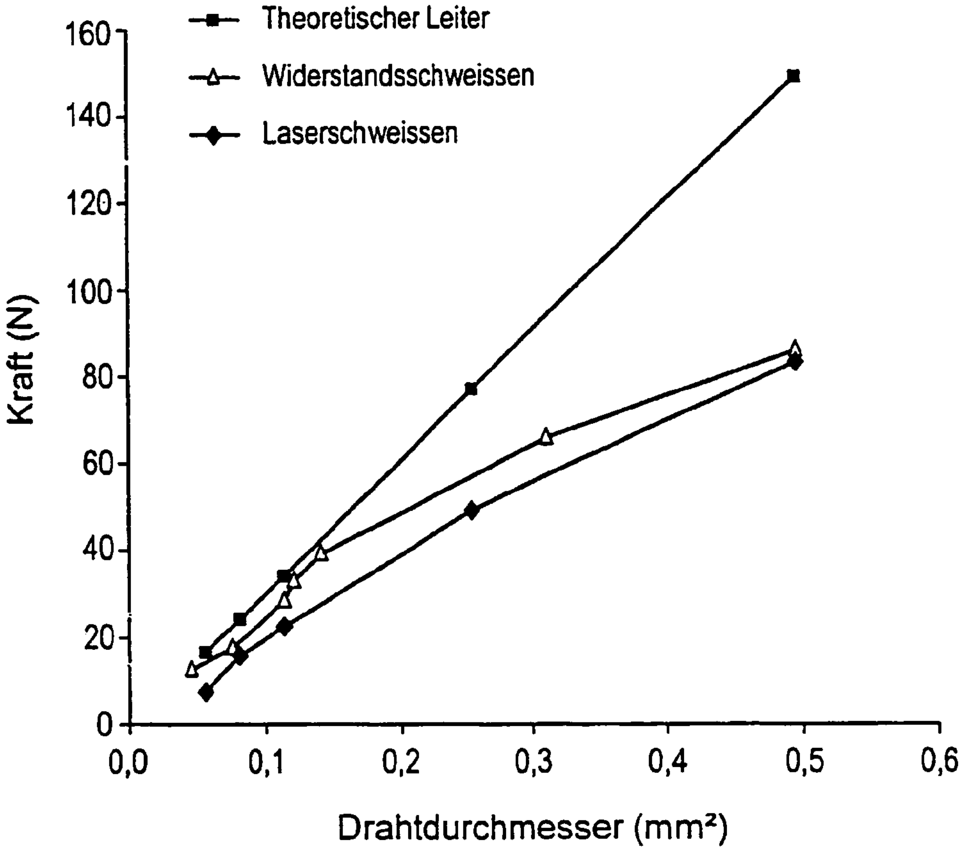
FIG. 2 shows the connection between wire diameter and resistance to break for different types of welds.
Figure 3:
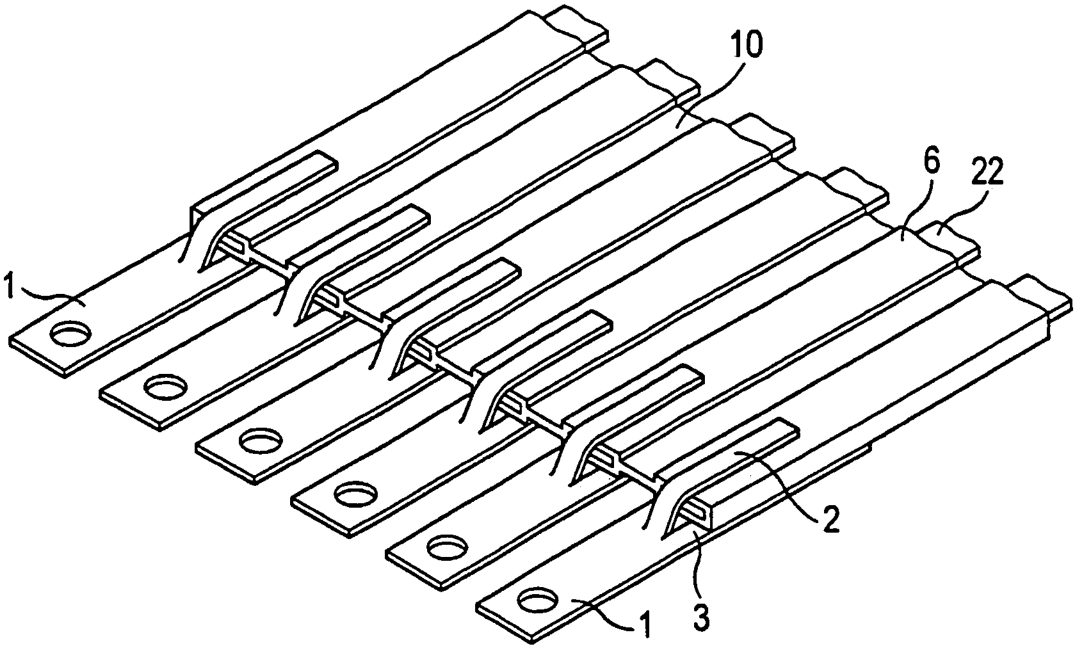
FIG. 3 shows an example of a flat conductor strip for connecting to several contact elements.

An excerpt of a circuit board 10 with its conductive tracks 22, which are provided with an insulation 6, is shown in FIG. 3. In addition, several contact elements 1 are disposed in order to connect, for example, the conductive tracks with plug connectors (not shown). In the example of embodiment shown, on its end that takes up the electrical conductor, the contact element 1 is equipped with three legs, the upper leg 2 and two lower legs 3. In the embodiment shown, the circuit board 10, for example, can be introduced to the welding device, and the latter conducts the welding method according to the invention at each contact element 1.

Figure 4A:
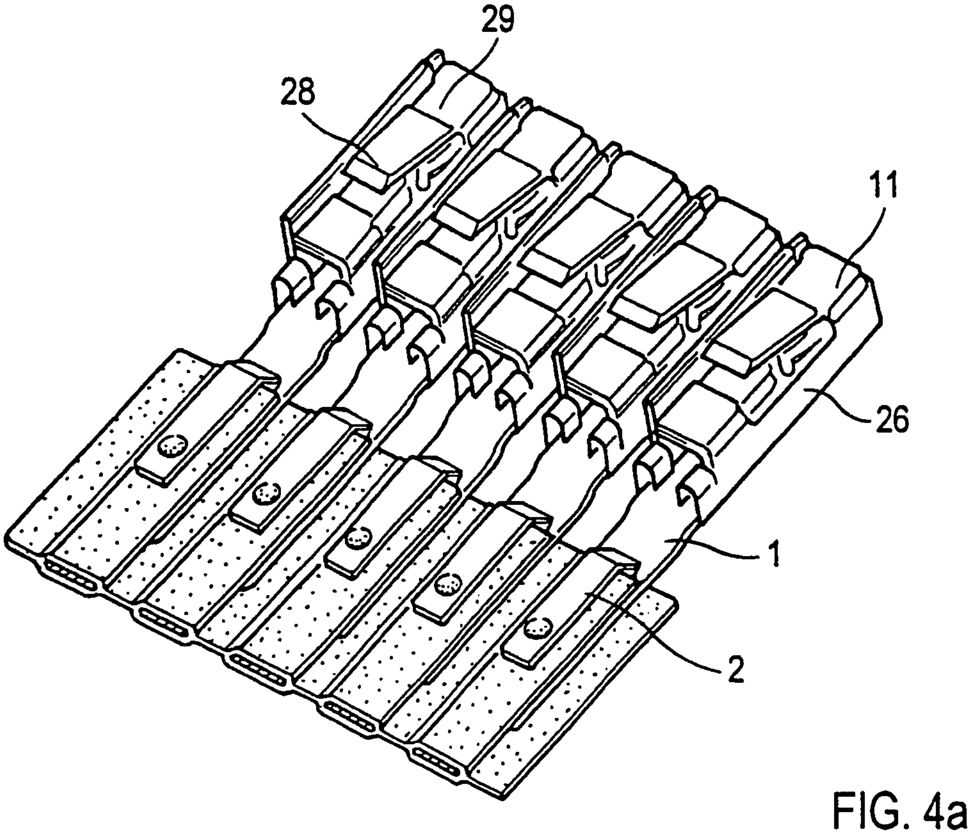
FIGS. 4*a*–4*d* show different embodiments of the connection of the electrical conductor with the contact element.
Figure 4B:
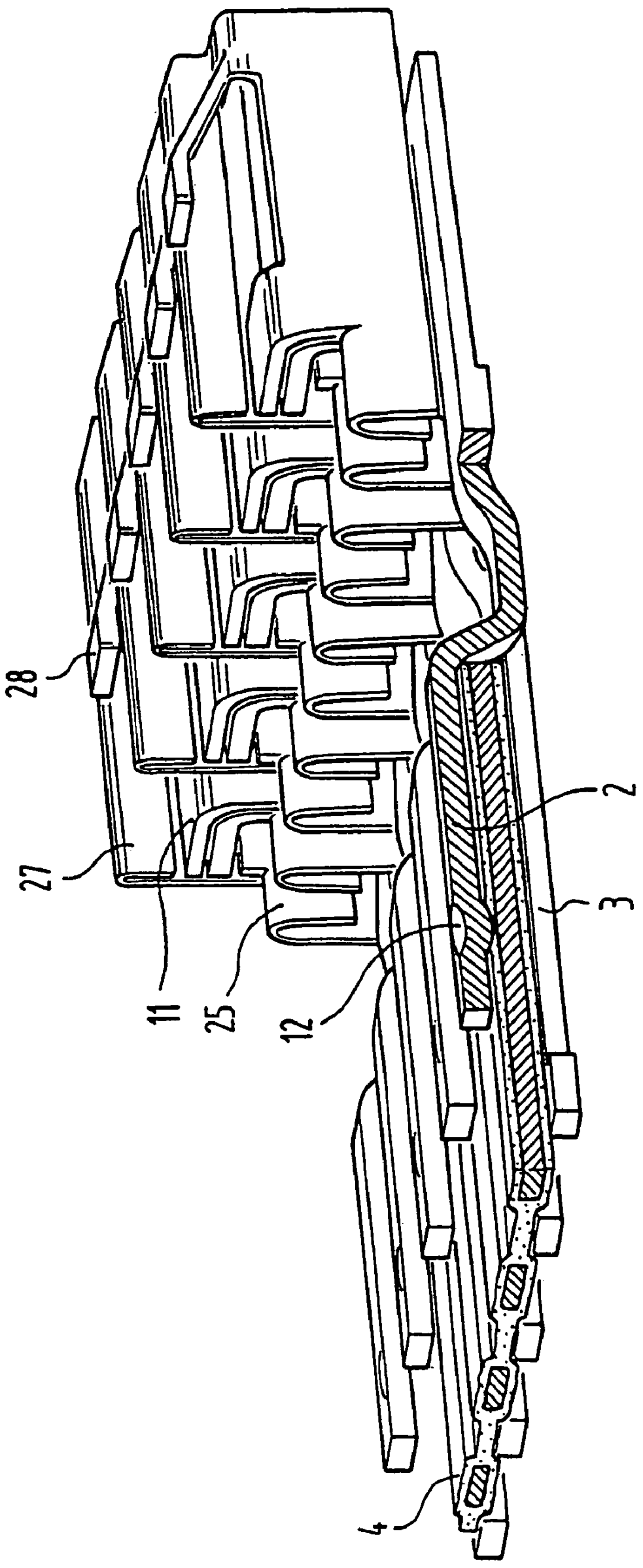

Several plug connectors 11 are shown in FIG. 4*a,* and these were plugged onto contact element 1 after the welding process had been completed, whereby contact element 1, as shown in FIG. 3, is C-shaped. In FIG. 4*b,* it is shown how the electrical conductor 4 is inserted between the two legs 2, 3 of contact element 1. In this case, the contact element is bent in C-shape. In addition, the depression 12 can be recognized in the form of a welding site, on which the welding process according to the invention was conducted. The contact element is bent in S shape in FIG. 4*c,* whereby the electrical conductor 4 was inserted into the upper opening of the S shape and then was welded.

The contact element 1, which is soldered to the conductive track at one end, is provided on its other end with the plug connector 11, which is shaped like a bushing in the embodiment shown.

The plug connector 11 has clips 25, which are bent inwardly, on its back end, on which can be attached, among other things, conductor elements of a mating plug connector. The plug connector has an insulating housing 26, which has a raised side wall 27 for encoding and a locking leg 28, which extends obliquely upward, spring-loaded by a bridge 29 counter to the direction of introduction, with which the plug connector 11 can be attached in an uptake (not shown).

Figure 4C:
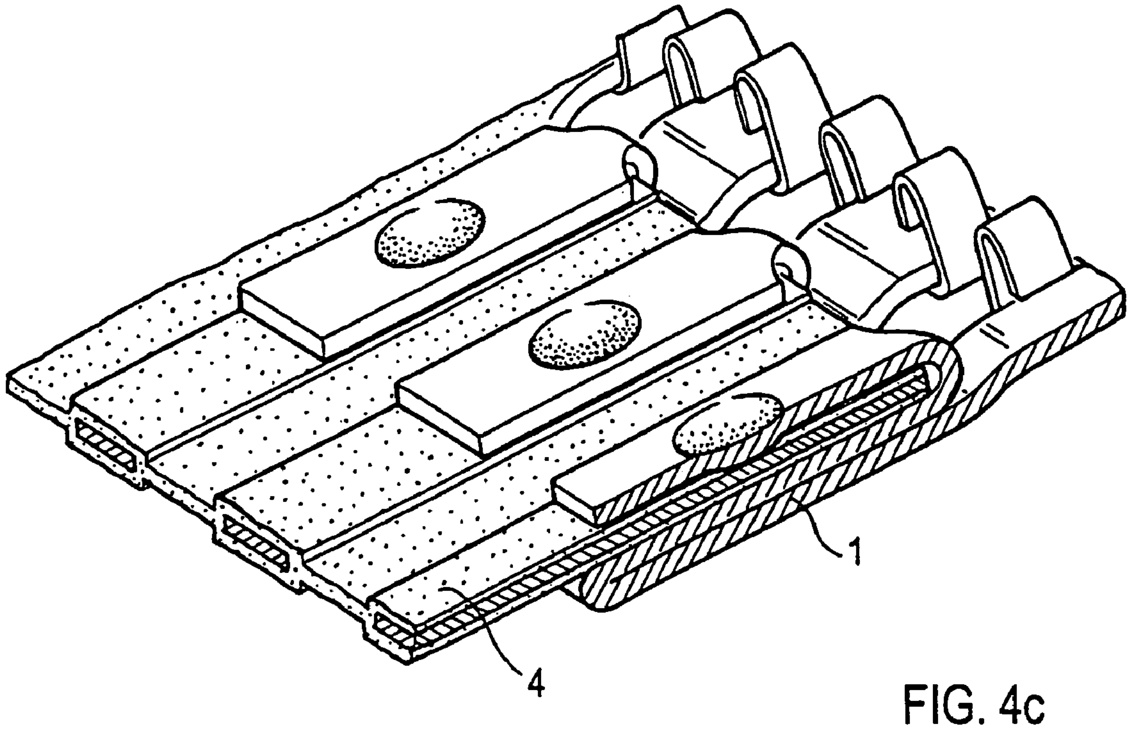
Figure 4D:
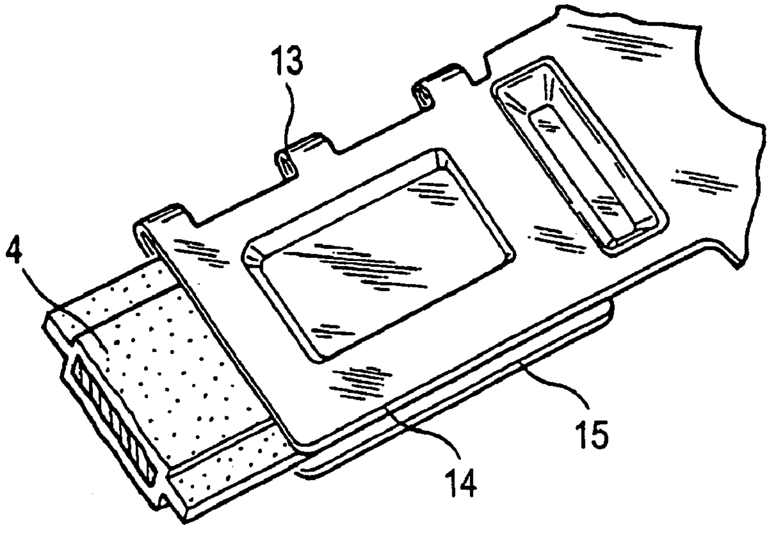

In FIG. 4*d* is shown another embodiment according to the invention, wherein the contact element 1 is comprised of two plates 14, 15 connected via crosspieces 13, which were folded laterally over the electrical conductor 4.

Figure 5:
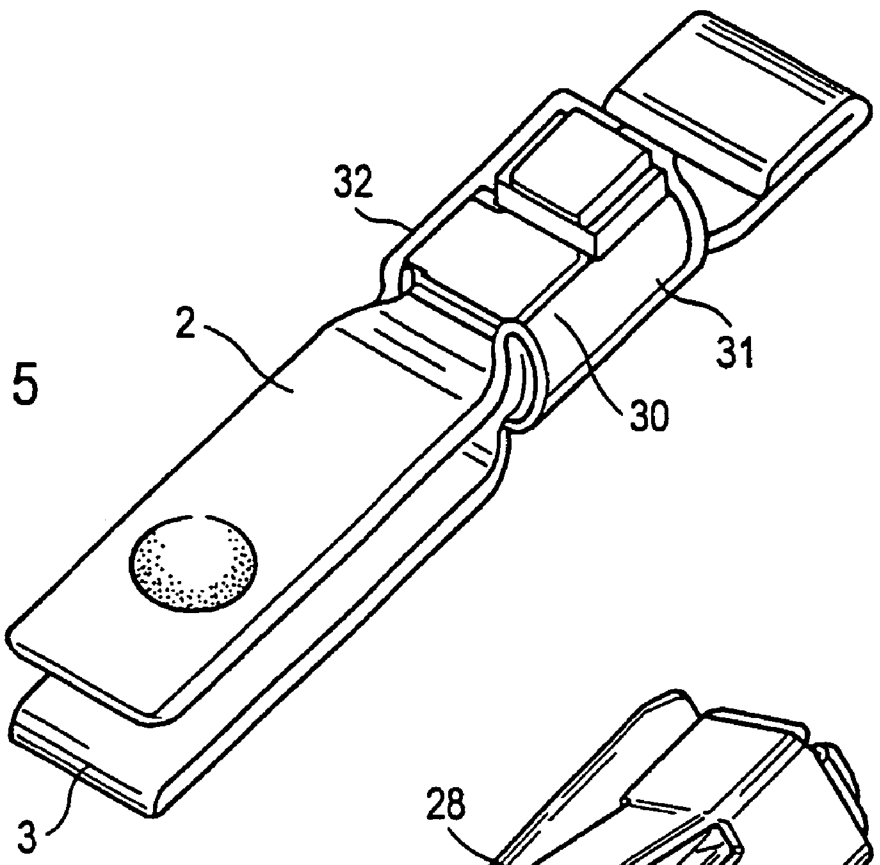
FIG. 5 shows another embodiment of the contact element.

FIG. 5 shows another embodiment of contact element 1, wherein the two legs are formed on the upper side and the lower side, respectively, of a housing 30. The two legs 2, 3 and the front section of housing 30 provide for the U-shaped formation of contact element 1. Housing 30 is closed on all four sides. Sides 31 and 32 of the housing 30 may also extend further in the direction of legs 2 and 3, so that legs 2, 3 would be enclosed on four sides on their end turned toward the housing 30, whereby the stiffness of legs 2, 3 would be increased. The contact element shown in FIG. 5 is likewise surrounded by the housing 26 shown in FIGS. 4*a* and 4*b*.

Figure 6:
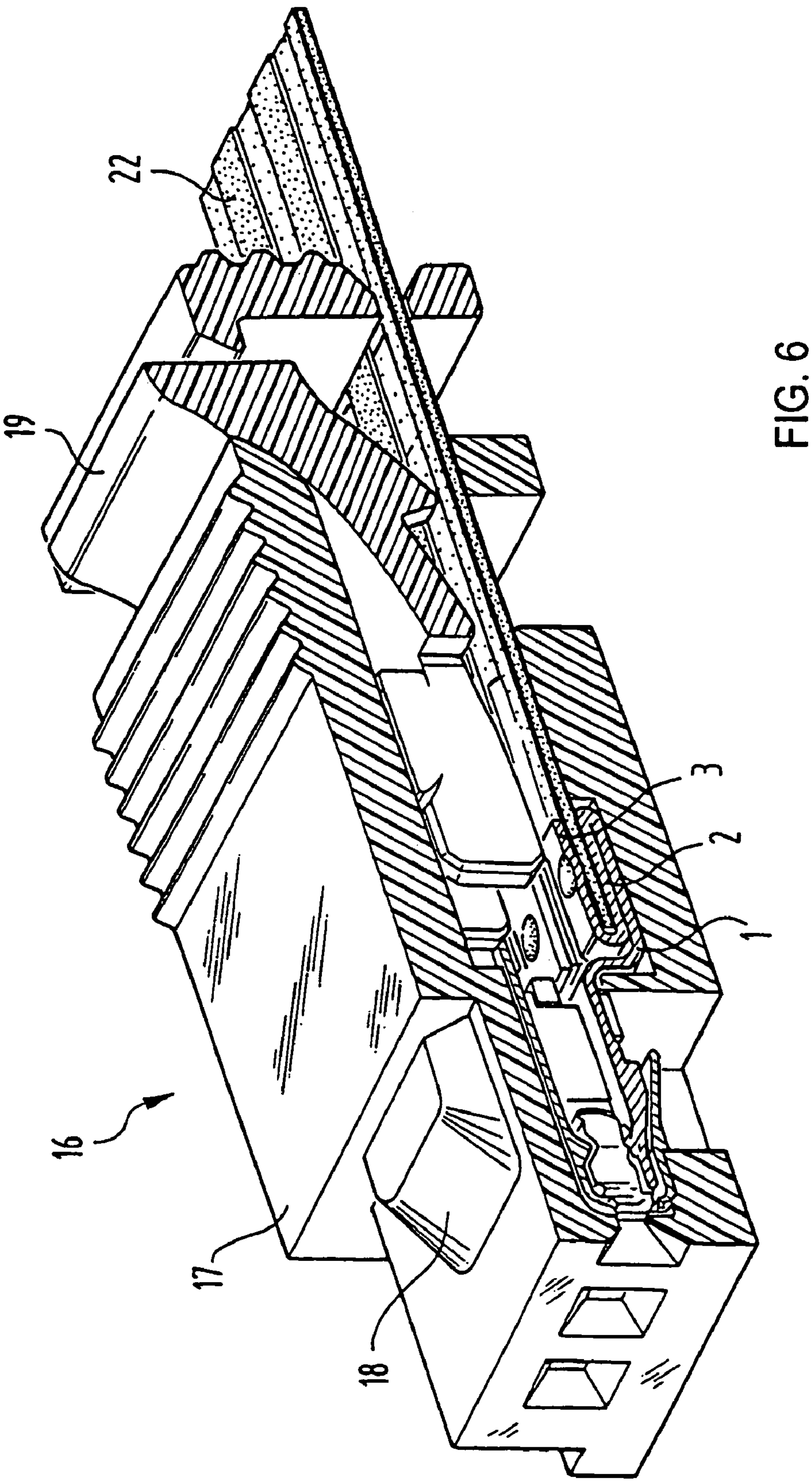
FIG. 6 shows a plug connector, in which the connection between conductor and contact element was produced according to the method of the invention.

FIG. 6 shows a plug connector 16, which has the contact element 1 shown in FIG. 4*c*. The plug connector 16 has a housing 17 of insulating material, which has a locking element 18 on the front end. The individual conductive tracks 22 are introduced into the plug connector from behind, whereby a strain relief slide 19 is provided for the broad conductor strip. The conductive tracks end in the opening between the two legs 2 and 3 of contact element 1, here formed in S shape, which has on its front end a conventional contact bushing for the uptake of a contact pin (not shown).

Figure 7:
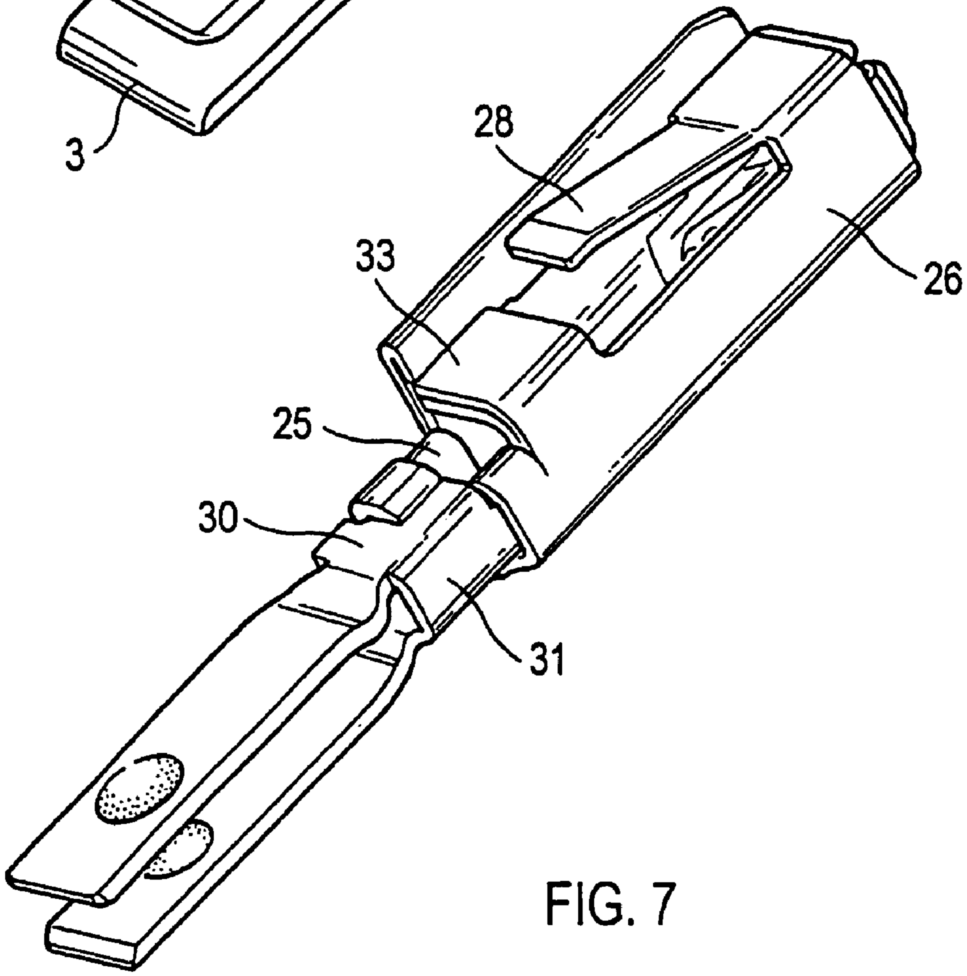
FIG. 7 shows the contact element shown in FIG. 5 with a housing.

FIG. 7 shows the U-shaped contact element shown in FIG. 5, wherein the end lying opposite the legs 2, 3 is provided with the housing 26. The housing has a crosspiece 33 behind the locking leg 28. Behind this crosspiece are connected the clips 25 which are bent around toward the inside, and which are bent around the the side walls 31, 32 of housing 30 extended toward the front, in order to affix the housing 26 to the contact element.

In summary, it can be established that a good electrical connection between an electrical conductor and a contact element can be achieved by the method according to the invention in a simple and rapid manner, with a welding method.

The invention claimed is:

1. A method for the electrical connection of an electrical conductor to a contact element with the following steps:

introduction of the electrical conductor ensheathed with an insulation between two legs of the contact element, application of a welding device to both legs, conducting the welding process by switching on the welding current, wherein the heat introduced during the welding process breaks down the insulation of the electrical conductor and leads to a solid mechanical and electrical connection of the conductor with the contact element, wherein the two legs of the contact element are located on respective opposite sides of the electrical conductor, and wherein each leg is welded to the electrical conductor only on its respective opposite side of the electrical conductor.

2. The method according to claim 1, further characterized in that the welding process is a resistance welding.

3. The method according to claim 2, further characterized in that at the beginning of the welding process, the welding current flows over the two legs of the contact element and its connection point.

4. The method according to claim 1, further characterized in that the welding device is applied to the outer sides of the two legs lying opposite the conductor.

5. The method according to claim 4, further characterized in that a welding stamp of the welding device is applied in each case to one outer side of contact element.

6. The method according to claim 1, further characterized in that the contact element is connected to a plug connector.

7. The method according to claim 1, further characterized in that the conductor ensheathed with an insulation is a flat flex conductor.

8. The method according to claim 1, further characterized in that the contact element is bent in an S-shape.

9. The method according to claim 1, further characterized in that the contact element is bent in a C-shape.

10. A plug connector with a contact element and an electrical conductor, which is connected to the contact element, is hereby characterized in that the connection between contact element and electrical conductor was produced according to a method according to claim 1.

11. The method according to claim 2, wherein the electrical conductor comprises an electrically conductive substantially flat core and substantially flat sheets of the insulation on opposite sides of the core.

12. The method according to claim 1 wherein the legs comprise two substantially flat, substantially parallel legs.

13. The method according to claim 12 wherein the legs are substantially flat, substantially parallel both before and after conducting the welding process.

14. The method according to claim 1 wherein the welding device comprises substantially flat electrode tips.

15. The method according to claim 1 wherein a distant between electrode tips of the welding device at a start of the welding process is smaller than a length of the legs.

16. A method of connecting an electrical conductor to a contact element comprising;

inserting the electrical conductor into the contact element, wherein the contact element comprises two substantially parallel legs, wherein the electrical conductor comprises an electrically conductive substantially flat core and insulating material surrounding the core, and wherein the electrical conductor is inserted between the legs; and applying a welding process to the legs to melt at least a portion of the insulating material between the legs and directly attach the legs to opposite respective sides of the flat core.

17. A method of connecting an electrical conductor to a contact element comprising:

inserting the electrical conductor into the contact element, wherein the contact element comprises two legs, wherein the electrical conductor comprises an electrically conductive core and insulating material surrounding the core, and wherein the electrical conductor is inserted between the legs; and applying a welding process to the legs by a welding device to melt at least a portion of the insulating material between the legs and directly attach the legs to opposite respective sides of the core, wherein a distance between furthest portions of opposing electrode tips of the welding device at a start of the welding process is smaller than a length of insertion of the core along the legs.

18. A method as in claim 17 wherein the core comprises a substantially flat core and the insulating material comprises substantially flat sheets on opposite sides of the core, and wherein the legs comprise substantially flat legs such that the welding of the legs to the core forms a substantially flat sandwich structure.

19. A method as in claim 17 wherein the legs are directly electrically and mechanically connected to each other by the core.

* * * * *